(12) United States Patent
Bax et al.

(10) Patent No.: US 10,523,130 B2
(45) Date of Patent: Dec. 31, 2019

(54) ALTERNATE GROUNDING OF INVERTER MIDPOINT FOR THREE LEVEL SWITCHING CONTROL

(71) Applicant: Hamilton Sundstrand Corporation, Charlotte, NC (US)

(72) Inventors: Randall Bax, Rockton, IL (US);
Huazhen Chai, Caledonia, IL (US);
Frank Z. Feng, Loves Park, IL (US);
Ryan W. Schmid, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/876,984

(22) Filed: Jan. 22, 2018

(65) Prior Publication Data

US 2019/0229643 A1 Jul. 25, 2019

(51) Int. Cl.

| H02M 7/483 | (2007.01) |
| H02M 7/48 | (2007.01) |
| H02M 1/12 | (2006.01) |
| H02M 1/00 | (2006.01) |
| H02M 7/5387 | (2007.01) |
| H02P 6/18 | (2016.01) |

(52) U.S. Cl.
CPC .............. *H02M 7/48* (2013.01); *H02M 1/12* (2013.01); *H02M 7/483* (2013.01); *H02M 2001/0012* (2013.01); *H02M 2001/123* (2013.01); *H02M 2007/53876* (2013.01); *H02P 6/187* (2013.01)

(58) Field of Classification Search
CPC ...... H02J 3/36; H02J 2003/365; H02M 7/483; H02M 7/487; H02M 1/12; H02M 1/14; H02M 1/143; H02M 2001/123

USPC ............................................... 363/34, 35, 37
See application file for complete search history.

(56) References Cited

U.S. PATENT DOCUMENTS

| 4,922,400 A * | 5/1990 | Cook ................... H02M 7/5387 363/132 |
| 5,852,558 A * | 12/1998 | Julian .................... H02M 1/12 363/132 |
| 6,154,378 A * | 11/2000 | Peterson ............... H02M 5/458 363/132 |
| 8,766,570 B2 | 7/2014 | Geyer et al. |
| 9,325,264 B2 | 4/2016 | Iwaji et al. |

(Continued)

OTHER PUBLICATIONS

Extended European Search Report for European Application No. 19153043.5; Date of Completion: May 24, 2019; dated Jun. 3, 2019; 8 Pages.

(Continued)

*Primary Examiner* — Alex Torres-Rivera
(74) *Attorney, Agent, or Firm* — Cantor Colburn LLP (57) ABSTRACT

A method of and system for controlling a DC midpoint of a multi-level inverter. The method includes receiving an input power signal from an AC power source at a multi-level motor control system that includes a DC bus and a multi-level inverter configured to supply a load, the DC bus having a DC midpoint, connecting a DC midpoint of a DC bus to a neutral point of the AC power source, while isolating a neutral point of a load supplied by the multi-level inverter from the DC midpoint, monitoring a voltage on the DC midpoint of the DC bus. In addition, the method may include controlling a voltage of the neutral point of the AC load based on imbalances in the load supplied by the multi-level inverter.

17 Claims, 4 Drawing Sheets

(56) References Cited

U.S. PATENT DOCUMENTS

| | | | |
|---|---|---|---|
| 2005/0063205 A1* | 3/2005 | Stancu | H02M 7/53875 363/132 |
| 2008/0298103 A1* | 12/2008 | Bendre | H02M 7/487 363/89 |
| 2010/0172166 A1* | 7/2010 | Singh | H02M 1/42 363/131 |
| 2011/0141783 A1* | 6/2011 | Murali Dora | H02J 9/062 363/127 |
| 2013/0258725 A1* | 10/2013 | Colombi | H02J 3/26 363/37 |
| 2013/0279216 A1* | 10/2013 | Nguyen | H02M 1/14 363/41 |
| 2016/0208781 A1 | 7/2016 | Kjær et al. | |
| 2016/0268923 A1* | 9/2016 | Bremicker | H02M 1/12 |

OTHER PUBLICATIONS

Premgamone et al. "Three-Dimension Space Vector Modulation for Three-Level Four-Leg Inverters with DC-Link Capacitor Voltage Balancing and Switching Loss Minimization", 2017 6th International Conference on Clean Electrical Power (ICCEP), IEEE, Jun. 27, 2017, pp. 578-584, XP033139042.

Sharma et al. "Control of Three-Level NPC Converters in DFIG based Off-Grid Wind Energy Conversion Systems", IECON 2015—41st Annual Conference of the IEEE Industrial Electronics Society, IEEE, Nov. 9, 2015, pp. 1008-1013, XP032855346.

\* cited by examiner

ALTERNATE GROUNDING OF INVERTER MIDPOINT FOR THREE LEVEL SWITCHING CONTROL

BACKGROUND

The subject matter disclosed herein generally relates to a three level inverter and, more particularly, to controlling voltage at the midpoint of the three level inverter.

Aircraft power systems commonly include a generator to generate AC power and a drive system connected the generator for providing excitation to an electric motor for powering actuators and the like. Such drive systems commonly employ rectifier or converter sections to receive the incoming AC power, rectify it, and supply it to a DC bus and an inverter. The drive also may include an inverter that receives DC power from the rectifier/converter and DC bus and provides excitation signals to a machine or load accordingly.

Active front end (AFE) converters in drives are commonly multilevel configurations and employ a pulse width modulated (PWM) switching techniques to convert input AC power to DC output power and provide the output power to the bus. Furthermore, the inverter may also be a multilevel configuration and employ a pulse width modulation technique to then convert the voltage DC power on the bus to AC output currents to drive the load, e.g., a motor. Such active front end converters are typically coupled with input filters, such as LCL filter circuits connected to each power phase. Since the front end rectifier is a switching circuit, the input filter operates to prevent introduction of unwanted harmonic content into the power source. Likewise the inverters may also include filters on the output to provide filtering and isolate unwanted harmonics and common mode interference.

Three level converters and/or inverters have a DC midpoint terminal in addition to a DC positive and a DC negative terminal. Because of the particular arrangement of the DC midpoint, the DC midpoint node voltage is not typically controlled by a power source in order to provide isolation and minimize filter requirements. Therefore, the DC midpoint node voltage can move relative to ground and be difficult to control with three phase loading, especially for unbalanced loads. This imbalance is preferably minimized in order to maintain output current power quality and limit insulated-gate bipolar transistor (IGBT) and DC capacitor voltage stress.

Methods and system elements have been developed to control the DC midpoint voltage. For example, one method of controlling the DC midpoint voltage of a three-level inverter is to utilize a proportional-integral PI regulator. Specifically, the input to the PI regulator is the error in the DC midpoint voltage. A zero-sequence voltage, proportional to the PI regulator output, is applied on the inverter output to reduce the error in the DC midpoint voltage. This loop gain increases as the output power of the inverter increases. Consequently the system may grow unstable at different operating points and present other difficulties for the inverter. Other ways of controlling the DC midpoint voltage in the inverter include filtering and partial isolation schemes. Other methods include direct control of the DC midpoint to selected voltage potential or sophisticated inverter switching techniques.

Accordingly for at least the above discussed reasons, as well as others, there is a desire to provide improved control methods for a multi-level inverter DC midpoint voltage.

BRIEF DESCRIPTION

Described herein in an embodiment is a method of controlling a DC midpoint of a multi-level inverter. The method includes receiving an input power signal from an AC power source at a multi-level motor control system that includes a DC bus and a multi-level inverter configured to supply a load, the DC bus having a DC midpoint, and operably connecting the DC midpoint of a DC bus to a neutral point of the AC power source, while isolating a neutral point of the load supplied by the multi-level inverter from the DC midpoint.

Also described herein in another embodiment is a method of and system for controlling a DC midpoint of a multi-level inverter. The method includes receiving an input power signal from an AC power source at a multi-level motor control system that includes a DC bus and a multi-level inverter having a fourth phase leg, connecting a DC midpoint of a DC bus to a neutral point of the AC power source, while isolating a neutral point of a load supplied by the multi-level inverter from the DC midpoint, monitoring a voltage on the DC midpoint of the DC bus; and controlling a voltage of the neutral point of the AC load based on imbalances in the load supplied by the multi-level inverter.

In addition to one or more of the features described above, or as an alternative, further embodiments may include receiving the input power signal at least one of a rectifier and a converter and supplying power to a DC bus; and In addition to one or more of the features described above, or as an alternative, further embodiments may include outputting an output power signal processed by the multi-level inverter, wherein the output power signal is a motor command signal.

In addition to one or more of the features described above, or as an alternative, further embodiments may include that the converter is at least one of an active converter and a multi-level converter.

In addition to one or more of the features described above, or as an alternative, further embodiments may include that the multi-level inverter is a three level inverter.

In addition to one or more of the features described above, or as an alternative, further embodiments may include filtering at least one of the input power signal from the AC power source and the output power signal processed by the multi-level inverter.

In addition to one or more of the features described above, or as an alternative, further embodiments may include the a multi-level inverter having a fourth phase leg, monitoring a voltage on the DC midpoint of the DC bus, and controlling a voltage of the neutral point of the AC load based on imbalances in the load supplied by the multi-level inverter.

In addition to one or more of the features described above, or as an alternative, further embodiments may include controlling the DC midpoint of the DC bus based on at least one of the imbalance in the load supplied by the multi-level inverter, the DC midpoint voltage, a voltage on the DC bus, and a current supplied to the load.

In addition to one or more of the features described above, or as an alternative, further embodiments may include that controlling is based on commands provided to the fourth phase leg.

In addition to one or more of the features described above, or as an alternative, further embodiments may include controlling the neutral point of the load relative to the DC midpoint based on at least one of the imbalance in the load supplied by the multi-level inverter, the DC midpoint voltage, a voltage on the DC bus, and a current supplied to the load.

In addition to one or more of the features described above, or as an alternative, further embodiments may include that controlling is based on commands provided to the fourth phase leg.

Also described herein in an embodiment is a multi-level motor control system operably connected to an AC power source and configured to power a load. The multi-level motor control system including a DC bus supplied by the AC power source, the DC bus having a DC midpoint operably connected to a multi-level inverter, the multi-level inverter having a fourth phase leg, where the DC midpoint of a DC bus is operably connected to a neutral point of an AC power source, while isolating a neutral point of a load supplied by the multi-level inverter from the DC midpoint. The system also includes a controller configured to provide control signals to the fourth phase leg of the multi-inverter to control a voltage of the neutral point of the AC load based on imbalances in the load supplied by the multi-level inverter.

In addition to one or more of the features described above, or as an alternative, further embodiments may include at least one of a rectifier and a converter operably connected to an AC power source configured to supply power to the DC bus.

In addition to one or more of the features described above, or as an alternative, further embodiments may include that the converter is at least one of an active converter and a multi-level converter.

In addition to one or more of the features described above, or as an alternative, further embodiments may include that the multi-level inverter is a three level inverter.

In addition to one or more of the features described above, or as an alternative, further embodiments may include that the multi-level inverter generates output power signals to the load, wherein the output power signal is a motor command signal.

In addition to one or more of the features described above, or as an alternative, further embodiments may include at least one of a first filtering element connected between the AC power source and DC bus and a second filtering element operably connected between AC output of the multi-level inverter and the load supplied by the multi-level inverter.

In addition to one or more of the features described above, or as an alternative, further embodiments may include the controller configured to control the DC midpoint of the DC bus based on at least one of the imbalance in the load supplied by the multi-level inverter, the DC midpoint voltage, a voltage on the DC bus, and a current supplied to the load.

In addition to one or more of the features described above, or as an alternative, further embodiments may include that the control is based on commands provided to the fourth phase leg.

In addition to one or more of the features described above, or as an alternative, further embodiments may include the controller configured to control the neutral point of the load relative to the DC midpoint based on at least one of the imbalance in the load supplied by the multi-level inverter, the DC midpoint voltage, a voltage on the DC bus, and a current supplied to the load.

In addition to one or more of the features described above, or as an alternative, further embodiments may include that the control is based on commands provided to the fourth phase leg.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

Figure 1:
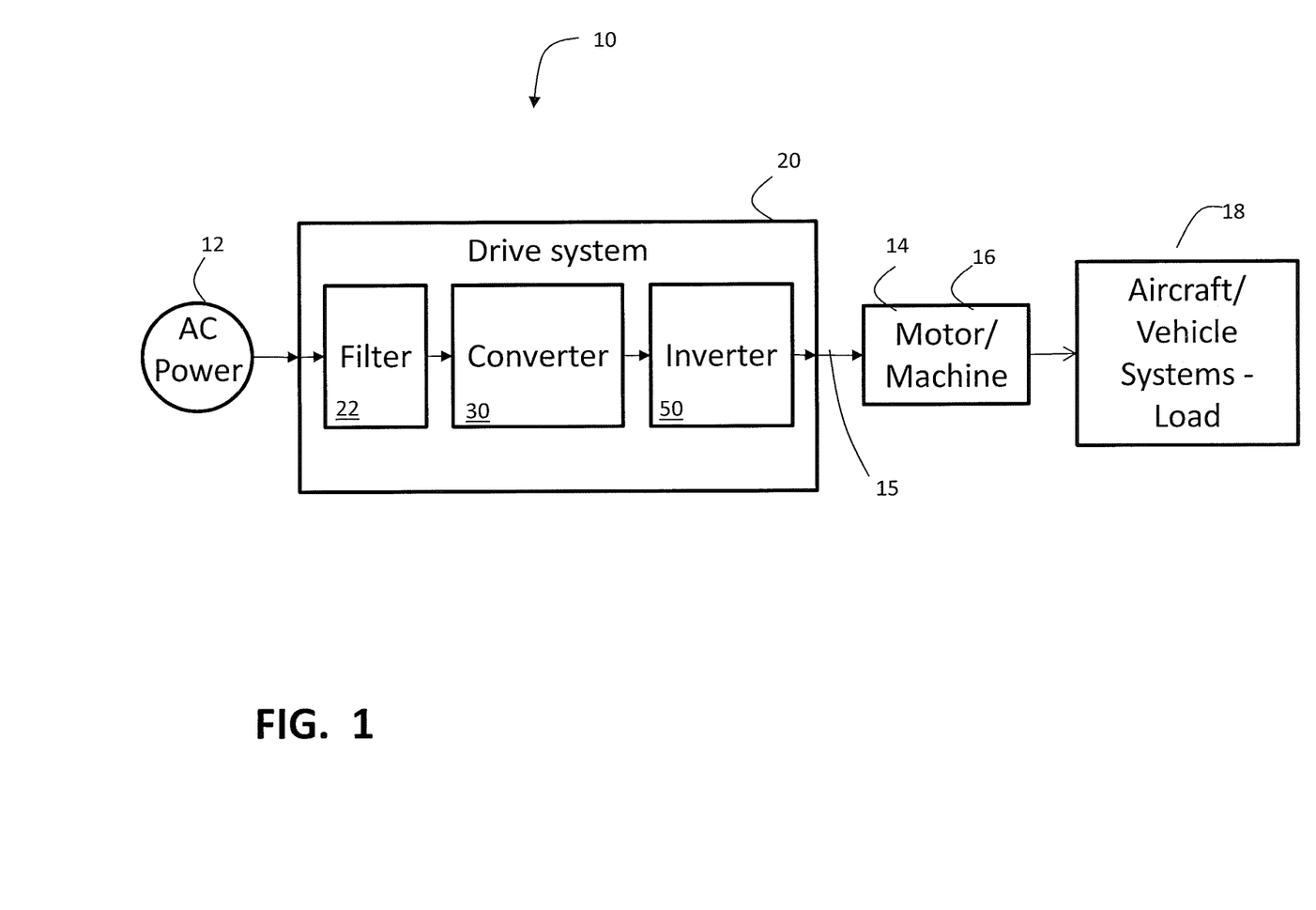
FIG. 1 depicts a high level block diagram of generator and three-level inverter for providing excitation to a load in accordance with one or more embodiments.

FIG. 1 is a block diagram of components of a power system 10 as may be employed to power one or more systems or loads 18. The power system 10 is described with respect to an aircraft power system, however application to any system where a three phase or motor drive is employed may be envisioned. Power system 10 includes a source of AC power 12, such as an electrical main line (e.g., 115 volt AC 400 Hz, 3-phase). The AC power 12 is provided to a drive system 20. The drive 20 may include a filter 22 configured to limit inrush currents, stabilizes voltage levels and suppress electromagnetic interference (EMI). The drive 20 may also include a converter 30 to convert the AC power 12 to a DC voltage. The illustrated drive 20 also includes an inverter 50 to convert the DC voltage to multiphase, AC drive signals. Command signals 15 from the inverter 50 of the drive system 20 are supplied to a multiphase machine 14. For example, a motor 16 to impart motion to a control surface. In an exemplary embodiment, machine 14 includes, but is not limited to a multiphase, permanent magnet synchronous motor 16. It should also be appreciated, that while the embodiments herein are described primarily with reference to an aircraft electrical system and application, this description is for example only. The embodiments described here are readily applied to any application employing a three phase drive with a multiphase phase power application including any type of three phase load, such as motor controls, environmental control, control surface actuation, and any other three phase power system and/or motor control application.

Figure 2:
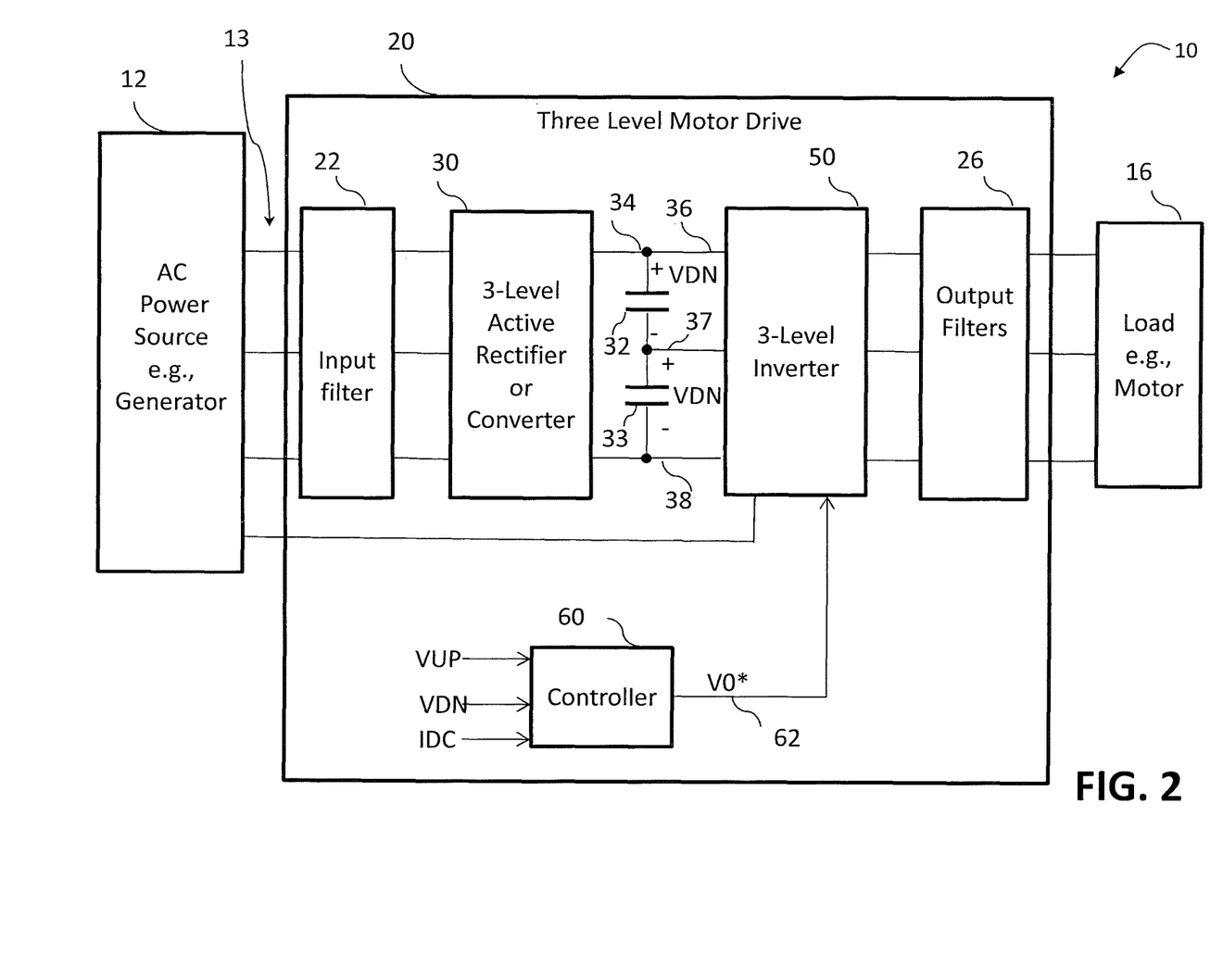
FIG. 2 depicts a more detailed block diagram of generator and three-level inverter for providing excitation to a load in accordance with one or more embodiments.

FIG. 2 is a block diagram of a multi-level motor drive 20 for balancing and controlling a DC midpoint 37 of a multi-level inverter 50 in accordance with one or more embodiments of the present disclosure. The multi-level motor drive 20 receives input power signals 13 from the AC power source 12. The input power signals 13 may be supplied to an input filter 22 as described above. The input power signals 13, once filtered, are provided to a rectifier or converter 30. The rectifier or converter 30 may be passive or active and may be a single or multi-level configuration. In an embodiment, the converter 30 is active and a three-level configuration. In another embodiment, the converter/rectifier 30 is a simpler passive configuration of a diode bridge. The output of the converter 30 supplies a DC bus 34 having a positive terminal 36 and a negative terminal 38. The DC bus 34 also has a DC midpoint or neutral point 37. A filter including the DC link capacitors 32 and 33 are positioned between the positive terminal 36 and the DC midpoint 37 and the DC midpoint 37 and the negative terminal 38. The multi-level inverter 50 includes as inputs the positive DC terminal 36, the DC midpoint 37, and the negative DC terminal 38.

Figure 3:
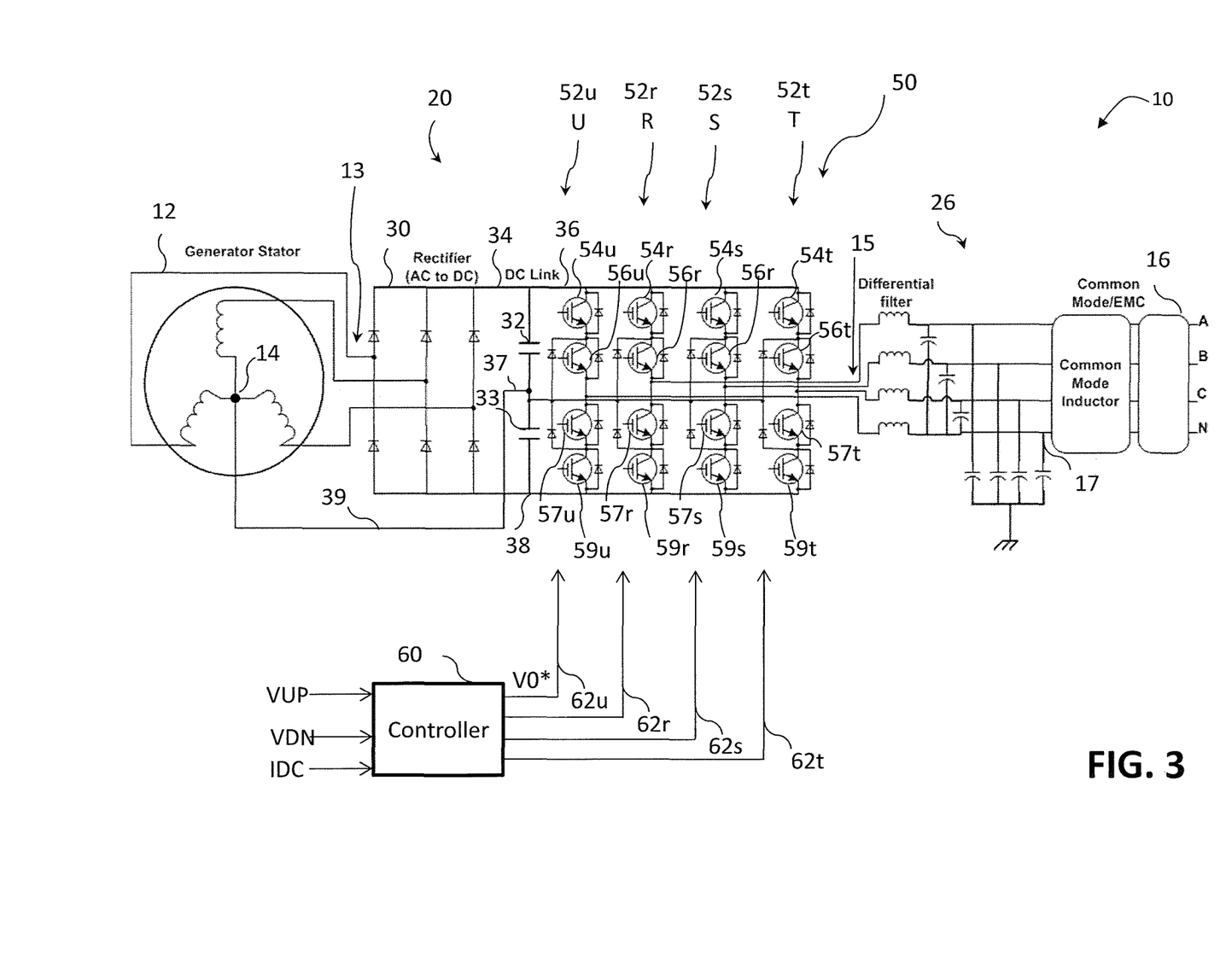
FIG. 3 is a block diagram of a three level motor controller system for balancing a DC midpoint of a three level inverter in accordance with one or more embodiments.

Turning now to FIG. 3 as well as FIG. 2, drive 20 is shown in greater detail and includes inverter 50 having at 3 phase legs, 52*r*, 52*s*, and 52*t* also denoted as R, S, and T respectively. Each phase leg, R, S, and T, (52*r*, 52*s*, and 52*t*) includes at least two complementary switching devices 56*r*, 57*r*; 56*s*, 57*s*; and 56*t*, 57*t* respectively positioned between the positive terminal 36 and negative terminal 38 of the DC bus 34 and controlled by control signals 62*r*, 62*s*, and 62*t* respectively from a drive controller (60) to convert DC power from the a DC bus 34 into motor command signals 15 to control the motor 16 or other load. In an embodiment, the inverter 50 may further employ a fourth phase leg 52*u*, which once again typically employs at least two complementary switching devices 56*u*, and 57*u* respectively and is controlled by a control signal 62*u*. In an embodiment, the inverter 50 is a three-level inverter 50 employing the four phase legs comprising 52*r*, 52*s*, 52*t*, and 52*u* also denoted as R, S, T and U in a multi-level inverter configurations each of the switching devices 54*r*, 57*r*; 54*s*, 57*s*; 54*t*, 57*t*, and 54*u*, 57*u* is cascaded with a second switching device 54*r*, 59*r*; 54*s*, 59*s*; 54*t*, 59*t*, and 54*u*, 59*u* respectively. For multi-level implementations, each of the phase legs 52*r*, 52*s*, 52*t*, and 52*u* include a diode isolated common point connected in common with the midpoint 37 of the DC bus 34. The outputs of the R, S, and T phase legs 52*r*, 52*s*, and 52*t* (e.g., the node of switching devices 56 and 57) provide the motor command signals 15 to the motor 16 or load via filter 26 as is conventionally known. The output of the U phase leg 52*u* (e.g., the node of switching devices 56*u* and 57*u*) is connected to the neutral point of the load e.g., motor 16) via filter 26. Multiple switching devices (e.g., 54*r*, 57*r*; 54*s*, 57*s*; 54*t*, 57*t*, and 54*u*, 57*u*) are employed in multi-level drives to facilitate voltage sharing and permit lower cost, higher voltage capability drives as is conventionally known.

According to one or more embodiments, both rectifier/converter 30 (if an active type) and inverter 50, are controlled by a controller 60. In an alternative embodiment, converter 30 and inverter 50 may be controlled by separate drive controllers, 60. As stated above controller(s) 60 provides control signals 62*r*, 62*s*, 62*t* and in some embodiments 62*u* to the switching devices 56*r*, 57*r*; 56*s*, 57*s*; 56*t*, 57*t*, and 56*u*, 54*u* (as well as cascaded switching devices 54*r*, 59*r*; 54*s*, 59*s*; 54*t*, 59*t* and 54*u*, 59*u* for multilevel configurations) of the R, S, T and U phase legs 52*r*, 52*s*, 52*t* 52*u* respectively to control generation of the of the motor command signals 15. Likewise the controller 60 may provide control signals (not shown) to the active rectifier or converter 30 to control generation and maintenance of the voltage on the DC bus 34. Drive controller 60 may be implemented using a general-purpose microprocessor executing a computer program stored on a storage medium to perform the operations described herein. Alternatively, drive controller 60 may be implemented in hardware (e.g., ASIC, FPGA) or in a combination of hardware/software.

In operation the controller 60 develops a DC current command for the converter 30 (if active) based on the operation the motor 16 and the inverter 50 generating the motor command signals 15. The DC current command is then employed to formulate the PWM control commands for the switching devices (not shown) of the converter 30 to provide a DC output current to the DC bus 34 accordingly. In addition, the controller 60 receives various input signals or values, including set point signals or values for desired output operation, such as motor speed, position, torque, etc., as well as feedback signals or values representing operational values of various portions of the motor drive 20. In another embodiment, a passive rectifier configuration for the converter 20 is employed and no PWM commands from the controller 60 are needed. While such a configuration is advantageous because of its simplicity for employing passive rectifiers to supply the DC bus 34, other configurations with an active converter 30 may be desirable for improved current and electromagnetic interference (EMI) control. Likewise, the controller 60 develops a command for the inverter 50 based on the operation the motor 16 e.g., speed, torque, and the like and the inverter 50 generating the motor command signals 15. The command is then employed to formulate the PWM control commands 62*r*, 62*s*, 62*t* for the switching devices 54*r*, 56*r*, 57*r*, 59*r*; 54*s*, 56*s*, 57*s*, 59*s*; and 54*t*, 56*t*, 57*t* 59*t* (hereinafter generally switching devices 54, 56, 57, 59) respectively of the inverter 50 to provide a formulate the motor command signals 15 accordingly.

Conventionally a pulse width modulation (PWM) control scheme is employed to command the switching devices 54, 56, 57, 59 respectively of the inverter 50 to generate and control the motor command signals 15 to the motor 16. Conventionally, such a PWM control scheme employs space vector pulse width modulation SVPWM techniques. Moreover, conventionally the SVPWM for the converter 30 (if active) and inverter 50 would be operated at the same frequency and synchronized. Synchronization of the PWM for both the converter 30 and the inverter 50 improves functions and reduces generated EMI from the operation of the switching devices (e.g., 54, 56, 57, and 59 of the inverter 50).

However, in some applications, other PWM techniques may be employed to address the advantages and constraints imposed by the construction or particular implementation of the converter 30 or inverter 50 Moreover, while it is well known that increasing switching frequency facilitates reductions in the size of magnetics, filters, improves acoustics, and the like, though it does result in increased switching losses in the switching devices (not shown) for the converter 30 or for the switching devices (e.g., 54, 56, 57, and 59) of the inverter 50. Therefore, in some embodiments, where an active converter 30 is employed it may be advantageous to operate the converter switching devices (not shown) at a different PWM frequency than those of the inverter 50.

Increased operating frequencies also results in increased switching losses for the switching devices (e.g., 54, 56, 57, and 59) and reduces efficiency causing the switching devices (e.g., 54, 56, 57, and 59) to potentially overheat. As a result, while SVPWM is effective for most applications though it is less efficient. Conversely, employing conventional discontinuous (DPWM) improves efficiency, but makes measuring the current impossible in selected phase legs e.g. 52*r*, 52*s*, and 52*t*, (or the phase legs (not shown) of the converter 30) if emitter side current sensing is employed. DPWM, advantageously, can be used at the expense of current sensing quality. In DPWM, current sensing is achieved via calculation via known methods of negative sum of two of the three phase legs. This computed phase current unfortunately results in some current distortion, acoustic noise, and the like. As a result, to protect the switching devices (e.g., 54, 56, 57, and 59), magnetics, and the like, DPWM is generally only be used in application where current control or distortion is less important and for short applications of high current (e.g., peak converter currents) periods of time.

Hybrid SVPWM is effectively a combination or hybrid of SVPWM and DPWM techniques. Hybrid SVPWM allows the lower switching device(s) (e.g., 57*r*, 59*r*; 57*s*, 59*s*; and 57*t*, 59*t*) to be ON, i.e., switching, for a more prolonged time (e.g., on the order of about ⅔ of the AC voltage cycle), but it also includes a period of time where the lower switching devices (e.g., 57*r*, 59*r*; 57*s*, 59*s*; and 57*t*, 59*t*) are off. Therefore, it allows for both emitter series current sensing and facilitates reduced switching losses. The reduced switching losses are achieved due to the switching being interrupted (e.g., approximately ⅓ of an AC voltage cycle).

Moreover for the inverter 50, in applications where torque/current control are important, low current distortion (and thereby low torque ripple) is desired. As such, continuous SVPWM or hybrid SVPWM techniques are employed to ensure good motor response. In addition, for the converter 30 (when an active converter is employed), continuous SVPWM or hybrid SVPWM techniques may be employed to ensure good motor response, but In applications where current control less critical and efficiency is more important and reducing switching losses and improve efficiency is more important hybrid SVPWM or DPWM may be employed.

Continuing with the FIG. 3, as described above, the inverter 50 is configured with a fourth leg 52*u* having switching devices 56*u*, and 57*u*, (as well as 54*u* and 59*u* for a multi-level implementation. As described above, the rectifier isolated common point of each of the phase legs 52*r*, 52*s*, 52*t*, and 52*u* is connected to the DC midpoint 37. In addition, in an embodiment the DC midpoint 37 is connected to the neutral point 14 of the AC power source 12 via line 39. This connection stabilizes the voltage on the DC midpoint 37 allowing some unbalanced currents at the DC midpoint 37 to be circulated back to the AC power source 12. As described above, the output of the phase leg 52*u* is connected via filter 26 to the neutral point 17 of the load (e.g., motor 16) to facilitate maintaining control of the voltage at the neutral point 17. In addition, the phase leg 52*u* also is controlling the neutral point 17 of the load, e.g., 16 to reduce or control circulating common mode currents and also to aide in balancing the DC midpoint voltage 37. That is, the isolation, voltage and imbalance between the neutral point 17 on the load e.g., motor 16 and the DC midpoint 37 is control through the fourth phase leg 52*u*. Advantageously this approach of isolating the DC midpoint 37 and the neutral 14 of the AC power source 12 from the neutral point 17 of the load avoids circulation of common mode currents from the load e.g., motor 16 and minimizes the effects of imbalances in the load.

The switching devices 54*u*, 56*u*, as well as 57*u*, 59*u* are controlled via a fourth control command 62*u* from the controller 60. In an embodiment the control command 62*u* is based on the operation the motor 16, imbalance of the load (e.g., motor 16) as well as the neutral point voltage 17, and the deviation of the midpoint 37. The controller 60 configures control command, which is then employed to formulate a PWM control commands for the switching devices 56*u*, and 57*u*, (as well as 54*u* and 59*u*) of the fourth phase leg 52*u* to facilitate the control. Once again, the controller 60 receives various input signals or values, including set point signals or values for desired output operation, such as motor speed, position, torque, etc., as well as feedback signals or values representing operational values of various portions of the motor drive 20 including but not limited to the midpoint voltage 37, the DC bus 34 voltages as well as the bus current and phase voltages and currents of the load e.g. motor 16 to formulate the control command 62*u*.

Figure 4:
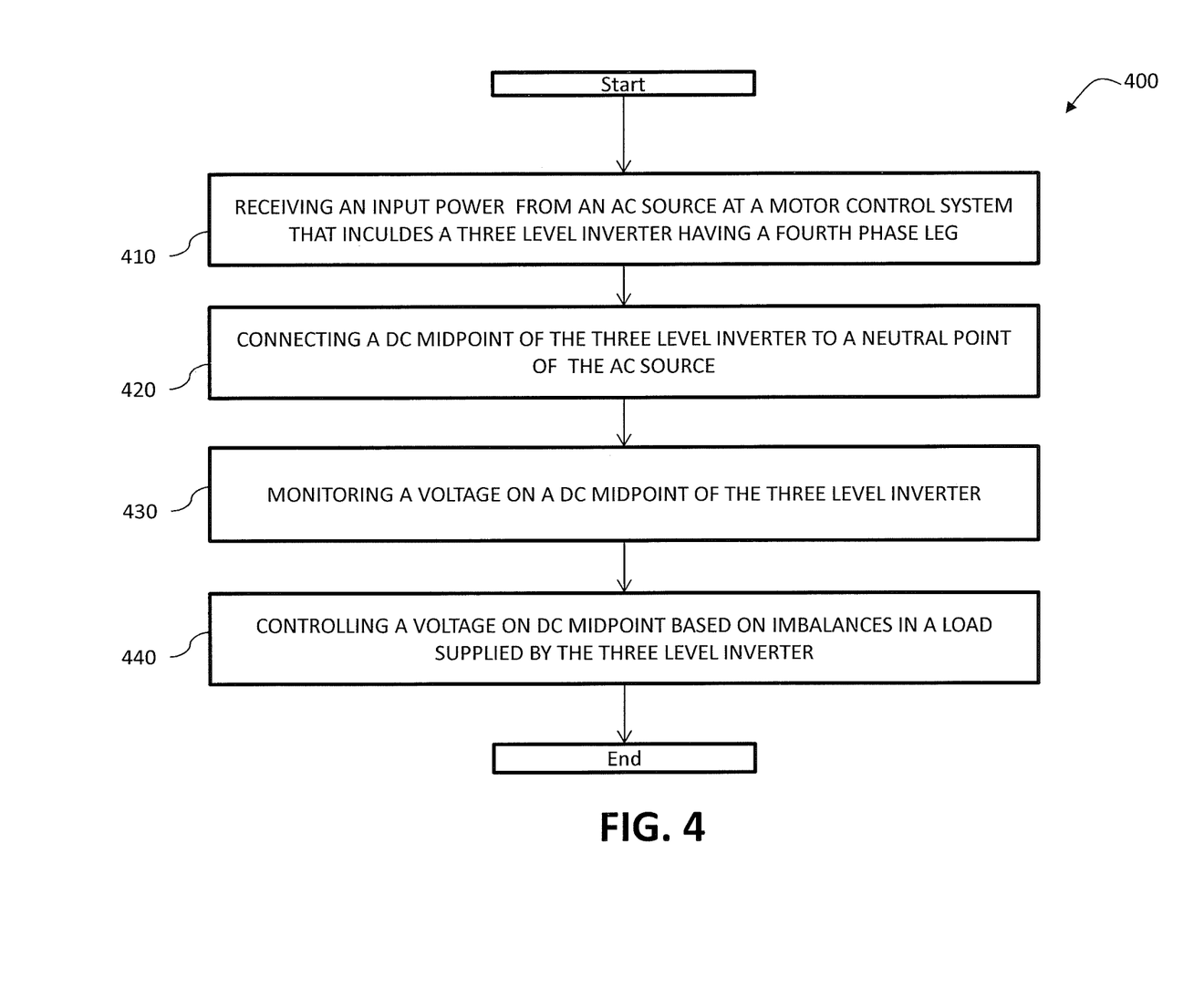
FIG. 4 is a flowchart of a method of balancing a DC midpoint of a three level inverter in accordance with one or more embodiments.

FIG. 4 is a flowchart of a method 400 of alternative control of DC midpoint 37 of a three level inverter 50 in accordance with one or more embodiment. One or more steps of the method may be implemented by controller 60 of the control system 10 as described herein. Moreover, some steps of the method 400 may be implemented as software or algorithms operating on the controller as is conventionally known. The method 400 includes receiving an input power signal at a control system 10 that includes a three level inverter 50 as depicted at process step 410. At process step 420 the method continues with connecting the DC midpoint 37 of the DC bus 34 (and the multi-level inverter 50 with the neutral point 14 or the AC power source 12. Further, the method 400 includes monitoring the voltage on the DC midpoint 37 as depicted at process step 430. Finally, as depicted at process step 440, the method 400 includes controlling the fourth phase leg 52*u* of the inverter 50 based on imbalances in the load supplied by the three level inverter 50. The control is implemented by adjusting the PWM control signals 62*u* that control the switching devices 54*u*, 56*u*, 57*u*, and 59*u* of the fourth phase leg 52*u*.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A method of controlling a direct current (DC) midpoint of a multi-level inverter having four phase legs, the method comprising:
   receiving an input power signal from an alternating current (AC) power source at a multi-level motor control system that includes a DC bus and the multi-level inverter configured to supply a load, the DC bus having the DC midpoint;
   operably connecting the DC midpoint of the DC bus to a neutral point of the AC power source allowing some unbalanced currents at the DC midpoint to be circulated back to the AC power source, while isolating, through a fourth phase leg, a neutral point of the load supplied by the multi-level inverter from the DC midpoint;
   monitoring a voltage on the DC midpoint of the DC bus; and
   controlling, through the fourth phase leg, a voltage of the neutral point of the AC load based on imbalances in the load supplied by the multi-level inverter,
   wherein the isolating of the neutral point from the DC midpoint through the fourth phase avoids circulating of common mode current from the load and minimizes the imbalances in the load.

2. The method of claim 1, further comprising:
   receiving the input power signal by at least one of a rectifier and a converter and supplying power to the DC bus; and
   outputting an output power signal processed by the multi-level inverter, wherein the output power signal is a motor command signal.

3. The method of claim 2, wherein the converter is at least one of an active converter and a multi-level converter.

4. The method of claim 3, wherein the multi-level inverter is a three level inverter.

5. The method of claim 1, further comprising filtering at least one of the input power signal from the AC power source and an output power signal processed by the multi-level inverter.

6. The method of claim 1, further including controlling the DC midpoint of the DC bus based on at least one of the imbalance in the load supplied by the multi-level inverter, the DC midpoint voltage, a voltage on the DC bus, and a current supplied to the load.

7. The method of claim 6, wherein controlling is based on commands provided to the fourth phase leg.

8. The method of claim 1, further comprising controlling the neutral point of the load relative to the DC midpoint based on at least one of the imbalance in the load supplied by the multi-level inverter, the DC midpoint voltage, a voltage on the DC bus, and a current supplied to the load.

9. The method of claim 8, wherein controlling is based on commands provided to the fourth phase leg.

10. A multi-level motor control system operably connected to an alternating current (AC) power source and configured to power a load, the multi-level motor control system comprising:
    a direct current (DC) bus supplied by the AC power source, the DC bus having a DC midpoint operably connected to a multi-level inverter having four phase legs configured to supply the load,
    wherein the DC midpoint of the DC bus is operably connected to a neutral point of the AC power source allowing some unbalanced currents at the DC midpoint to be circulated back to the AC power source, while isolating, through a fourth phase leg, a neutral point of the load supplied by the multi-level inverter from the DC midpoint, and a voltage on the DC midpoint of the DC bus is monitored; and
    a controller configured to provide control signals to the fourth phase leg of the multi-level inverter to control a voltage of the neutral point of the AC load based on imbalances in the load supplied by the multi-level inverter,
    wherein the isolating of the neutral point from the DC midpoint through the fourth phase avoids circulating of common mode current from the load and minimizes the imbalances in the load.

11. The multi-level motor control system of claim 10, further including at least one of a rectifier and a converter operably connected to the AC power source configured to supply power to the DC bus.

12. The multi-level motor control system of claim 10, wherein the multi-level inverter is a three level inverter.

13. The multi-level motor control system of claim 10, further comprising at least one of a first filtering element connected between the AC power source and the DC bus and a second filtering element operably connected between AC output of the multi-level inverter and the load supplied by the multi-level inverter.

14. The multi-level motor control system of claim 10, further including the controller configured to control the DC midpoint of the DC bus based on at least one of the imbalance in the load supplied by the multi-level inverter, the DC midpoint voltage, a voltage on the DC bus, and a current supplied to the load.

15. The multi-level motor control system of claim 14, wherein the control is based on commands provided to the fourth phase leg.

16. The multi-level motor control system of claim 10, further comprising the controller configured to control the neutral point of the load relative to the DC midpoint based on at least one of the imbalance in the load supplied by the multi-level inverter, the DC midpoint voltage, the voltage on the DC bus, and a current supplied to the load.

17. The multi-level motor control system of claim 16, wherein the controlling is based on commands provided to the fourth phase leg.

* * * * *